(12) United States Patent
Griffiths (10) Patent No.: US 10,482,752 B2
(45) Date of Patent: Nov. 19, 2019

(54) SEAT OCCUPANCY MONITOR

(71) Applicant: McLaren Applied Technologies Limited, Surrey (GB)

(72) Inventor: Matthew John Griffiths, Worcester (GB)

(73) Assignee: McLaren Applied Technologies Limited, Woking (GB)

(*) Notice: Subject to any disclaimer, the term of this patent is extended or adjusted under 35 U.S.C. 154(b) by 0 days.

(21) Appl. No.: 16/343,265

(22) PCT Filed: Oct. 20, 2017

(86) PCT No.: PCT/GB2017/053182
§ 371 (c)(1),
(2) Date: Apr. 18, 2019

(87) PCT Pub. No.: WO2018/073606
PCT Pub. Date: Apr. 26, 2018

(65) Prior Publication Data
US 2019/0251823 A1    Aug. 15, 2019

(30) Foreign Application Priority Data

Oct. 21, 2016 (GB) .................................. 1617861.8

(51) Int. Cl.
*G08B 21/00* (2006.01)
*G08B 21/22* (2006.01)
(Continued)

(52) U.S. Cl.
CPC ............. *G08B 21/22* (2013.01); *B60N 2/002* (2013.01); *B60N 2/24* (2013.01)

(58) Field of Classification Search
CPC ........ G08B 21/22; G08B 21/00; B60N 2/002; B60N 2/24
See application file for complete search history.

(56) References Cited

U.S. PATENT DOCUMENTS 8,170,745 B1    5/2012  Lors
2011/0050442 A1   3/2011  Hefferon
(Continued)

FOREIGN PATENT DOCUMENTS

WO    WO-2015/061547 A1    4/2015

OTHER PUBLICATIONS

International Searching Authority, International Search Report and Written Opinion for PCT Application No. PCT/GB2017/053182, dated Jan. 25, 2018, pp. 1-11.
(Continued)

*Primary Examiner* — Phung Nguyen
(74) *Attorney, Agent, or Firm* — Alston & Bird LLP (57) ABSTRACT

A device for monitoring one or more passenger seats of a vehicle, the device comprising: at least one sensor configured to monitor an occupancy status for each of the one or more seats; and a communication interface configured to receive reservation conditions for each of the one or more seats; wherein the device is configured to: display an occupancy condition for each of the one or more seats and a reservation condition for each of the one or more seats; and determine the occupancy condition for each of the one or more seats based on the occupancy status for each of the one or more seats over a predefined time period.

23 Claims, 2 Drawing Sheets

(51) Int. Cl.
*B60N 2/24* (2006.01)
*B60N 2/00* (2006.01)

(56) References Cited

U.S. PATENT DOCUMENTS

| | | | | |
|---|---|---|---|---|
| 2012/0242492 A1* | 9/2012 | Grunfeld | ................ | G08B 21/24 340/667 |
| 2014/0125355 A1* | 5/2014 | Grant | .................... | B64D 11/06 324/629 |
| 2015/0210287 A1* | 7/2015 | Penilla | .................. | B60W 40/08 701/49 |
| 2017/0200355 A1* | 7/2017 | Gruenbaum | ........... | B61D 41/00 |

OTHER PUBLICATIONS

UK Intellectual Property Office, Search Report for European Patent Application No. GB1617861.8, dated Sep. 18, 2017, pp. 1-3.

\* cited by examiner

SEAT OCCUPANCY MONITOR

CROSS REFERENCE TO RELATED APPLICATIONS

This application is a National Stage Application, filed under 35 U.S.C. § 371, of International Application No. PCT/GB2017/053182, filed Oct. 20, 2017, which claims priority to United Kingdom Application No. 1617861.8, filed Oct. 21, 2016; the contents of both of which are hereby incorporated by reference in their entirety.

BACKGROUND

Related Field

This invention relates to a device, and a system, for monitoring one or more passenger seats of a vehicle.

Description of Related Art

Vehicles such as buses and trains are examples of passenger carrying vehicles. These vehicles tend to make stops at multiple passenger pick-up locations to permit passengers to embark and disembark from the vehicle. The vehicles tend to visit these locations along vehicle journeys according to a timetable that indicates when the vehicle should reach each of the locations. It is usual for an amount of time to be allocated in the timetable for the duration that is required to set-down and pick-up passengers from that stop. For the vehicle to complete its journey in accordance with the timetable, it is desirable that the amount of time the vehicle spends at each stop to be, at worst, equal to the time allocated in the timetable for this stop period. A vehicle can end up staying at a particular stop for longer than was planned if a large number of passengers wish to board the vehicle at that stop and/or if the passengers take a long time to board the vehicle. The passengers may take a long time to board the vehicle because they are each taking time to find an available seat on board the vehicle and this blocks passageways inside the vehicle that enable more passengers to board until each passenger locates a seat. It would therefore be desirable for there to be a way for passengers to more easily identify seats that are free when boarding the vehicle.

Many vehicle operators permit passengers to book seats on vehicle journeys in advance. These seats may be booked for part of the vehicle journey or all of it. In either case, the seat will only be booked for part of the time that the vehicle is in operation. Therefore, there may be other times when a passenger that has not booked that particular seat is permitted to sit in that seat. Some vehicles, such as trains, have slots into which paper tickets can be placed which indicate the reservation status of a particular seat during a particular vehicle journey. Some vehicles are now fitted with display units which are positioned near particular seats and display the seat reservations for those particular seats. This has the advantage that they can be updated for a particular vehicle journey without an operative needing to visit each seat to update the paper ticket located at that seat.

Many vehicles, and in particular trains, have a long service life compared to the rate of progress of technology. Many fleets of vehicles, and in particular trains, are moved around transport networks during their lifetimes to provide transport to different parts of the network. This means that it would also be desirable if older trains could be upgraded to include more modern technology that assists passengers with their journeys.

BRIEF SUMMARY

According to a first aspect of the present invention there is provided a device for monitoring one or more passenger seats of a vehicle, the device comprising: at least one sensor configured to monitor an occupancy status for each of the one or more seats; and a communication interface configured to receive reservation conditions for each of the one or more seats; wherein the device is configured to: display an occupancy condition for each of the one or more seats and a reservation condition for each of the one or more seats; and determine the occupancy condition for each of the one or more seats based on the occupancy status for each of the one or more seats over a predefined time period.

The occupancy status may comprise occupied and vacant. The occupancy condition may comprise occupied and vacant. The reservation condition may comprise reserved and unreserved. A vehicle journey may be associated with the vehicle, and the reservation condition may comprise periods of the vehicle journey where a seat is reserved and periods of the vehicle journey where the seat is unreserved.

The device may be configured to determine that the occupancy condition for a seat is occupied if the occupancy status for the respective seat is occupied during the predefined time period. The device may be configured to determine that the occupancy condition for a seat is occupied if the occupancy status for the respective seat is occupied for a threshold period of the predefined time period.

The device may be configured to determine that the occupancy condition for a seat is vacant if the occupancy status for the respective seat is vacant during the predefined time period. The device may be configured to determine that the occupancy condition for a seat is vacant if the occupancy status for the respective seat is vacant for a threshold period of the predefined time period.

The device may be configured to display the occupancy condition for each of the one or more seats and the reservation condition for each of the one or more seats only during display periods when passengers of the vehicle are boarding the vehicle and initially locating a seat. The device may be configured to display the occupancy condition for each of the one or more seats and the reservation condition for each of the one or more seats during display periods starting from a display starting time associated with when the vehicle enters a passenger pick-up location and until a display duration has elapsed. The device may monitor two passenger seats, the sensor may be configured to monitor the occupancy status for each of the two seats, and the device may be configured to display the occupancy condition for each of the two seats and the reservation condition for each of the two seats.

The device may monitor three passenger seats, the sensor may be configured to monitor the occupancy status for each of the three seats, and the device may be configured to display the occupancy condition for each of the three seats and the reservation condition for each of the three seats.

The device may comprise a seat occupancy indicator for each of the one or more seats and the seat occupancy indicators may each display the occupancy condition for a respective one of the one or more seats. The device may comprise a reservation indicator for each of the one or more seats and the reservation indicators may each display the reservation condition for a respective one of the one or more seats. The device may be configured to transmit the occupancy conditions to a controller device. The device may be configured to transmit the occupancy conditions to a controller device when the individual occupancy conditions change. The device may comprise one sensor per seat of the one or more seats and each sensor may be configured to monitor the occupancy status for a respective one of the one or more seats.

The sensor(s) may comprise infra-red sensors. The sensor(s) may comprise ultra-sound sensors. The device may comprise a power source. The power source may be a battery. The power source may be configured to draw power using energy harvesting. The energy harvesting may comprise at least one of: converting vibrations into electrical energy, converting light into electrical energy, and converting electromagnetic waves into electrical energy.

The device may be formed as part of the vehicle. The device may be a discrete device. The device may be configured to be attached to the vehicle. The device may be configured to be attached to the vehicle above the one or more seats the device monitors. The communication interface may be a wireless communication interface. The wireless communication interface may operate in accordance with at least one of: a Bluetooth protocol, a Zigbee protocol, and a mesh network protocol. The communication interface may be a wired communication interface.

According to a first aspect of the present invention there is provided a system for monitoring one or more passenger seats of a vehicle, the system comprising: at least one sensor configured to monitor an occupancy status for each of the one or more seats; a first display unit configured to: display an occupancy condition for each of the one or more seats, and determine the occupancy condition for each of the one or more seats based on the occupancy status for each of the one or more seats over a predefined time period; and a second display unit configured to: receive reservation conditions for each of the one or more seats, and display a reservation condition for each of the one or more seats; wherein the first and second display units are positioned proximal to the one or more seats.

The first and second display units may be positioned so that the occupancy conditions and reservation conditions are visible to a passenger located beside the one or more seats. The second display unit may comprise a communication interface configured to receive the reservation conditions for each of the one or more seats. The occupancy status may comprise occupied and vacant. The occupancy condition may comprise occupied and vacant. The reservation condition may comprise reserved and unreserved. A vehicle journey may be associated with the vehicle, and the reservation condition may comprise periods where a seat is reserved and periods where the seat is unreserved.

The first display unit may be configured to determine that the occupancy condition for a seat is occupied if the occupancy status for the respective seat is occupied during the predefined time period. The first display unit may be configured to determine that the occupancy condition for a seat is occupied if the occupancy status for the respective seat is occupied for a threshold period of the predefined time period. The first display unit may be configured to determine that the occupancy condition for a seat is vacant if the occupancy status for the respective seat is vacant during the predefined time period. The first display unit may be configured to determine that the occupancy condition for a seat is vacant if the occupancy status for the respective seat is vacant for a threshold period of the predefined time period.

The first display unit may be configured to display the occupancy condition for each of the one or more seats only during display periods when passengers of the vehicle are boarding the vehicle and initially locating a seat. The first display unit may be configured to display the occupancy condition for each of the one or more seats during display periods starting from a display starting time associated with when the vehicle enters a passenger pick-up location and until a display duration has elapsed. The sensor may be configured to monitor the occupancy status of two passenger seats; the first display unit may be configured to display the occupancy condition for each of the two seats; and the second display unit may be configured to display the reservation condition for each of the two seats. The sensor may be configured to monitor the occupancy status of three passenger seats; the first display unit may be configured to display the occupancy condition for each of the three seats; and the second display unit may be configured to display the reservation condition for each of the three seats.

The first display unit may comprise a seat occupancy indicator for each of the one or more seats and the seat occupancy indicators may each display the occupancy condition for a respective one of the one or more seats. The second display unit may comprise a reservation indicator for each of the one or more seats and the reservation indicators may each display the reservation condition for a respective one of the one or more seats. The first display unit may be configured to transmit the occupancy conditions to a controller device. The first display unit may be configured to transmit the occupancy conditions to a controller device when the individual occupancy conditions change.

The system may comprise one sensor per seat of the one or more seats and each sensor may be configured to monitor the occupancy status for a respective one of the one or more seats. The sensor(s) may comprise infra-red sensors. The sensor(s) may comprise ultra-sound sensors. The sensor(s), first display unit and second display unit may be formed as part of the vehicle. The sensor(s) may be positioned within the vehicle above the one or more seats the sensor(s) monitor.

The communication interface may be a wireless communication interface. The wireless communication interface may operate in accordance with at least one of: a Bluetooth protocol, a Zigbee protocol, and a mesh network protocol. The communication interface may be a wired communication interface.

BRIEF DESCRIPTION OF THE FIGURES

The present invention will now be described by way of example with reference to the accompanying drawings. In the drawings.

DETAILED DESCRIPTION OF VARIOUS EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a device and a system for monitoring one or more passenger seats of a vehicle.

The device comprises at least one sensor configured to monitor an occupancy status for each of the one or more seats. The device also comprises a communication interface configured to receive reservation conditions for each of the one or more seats. The device is configured to display an occupancy condition for each of the one or more seats. The device may also be configured to display a reservation condition for each of the one or more seats. The device may also be configured to determine the occupancy condition for each of the one or more seats based on the occupancy status for each of the one or more seats over a predefined time period.

The system comprises at least one sensor configured to monitor an occupancy status for each of the one or more seats. The system also comprises a first display unit. The first display unit may be configured to: display an occupancy condition for each of the one or more seats, and determine the occupancy condition for each of the one or more seats based on the occupancy status for each of the one or more seats over a predefined time period. The system also comprises a second display unit. The second display unit may be configured to: receive reservation conditions for each of the one or more seats, and display a reservation condition for each of the one or more seats. The first and second display units are positioned proximal to the one or more seats being monitored by the sensor.

Figure 1:
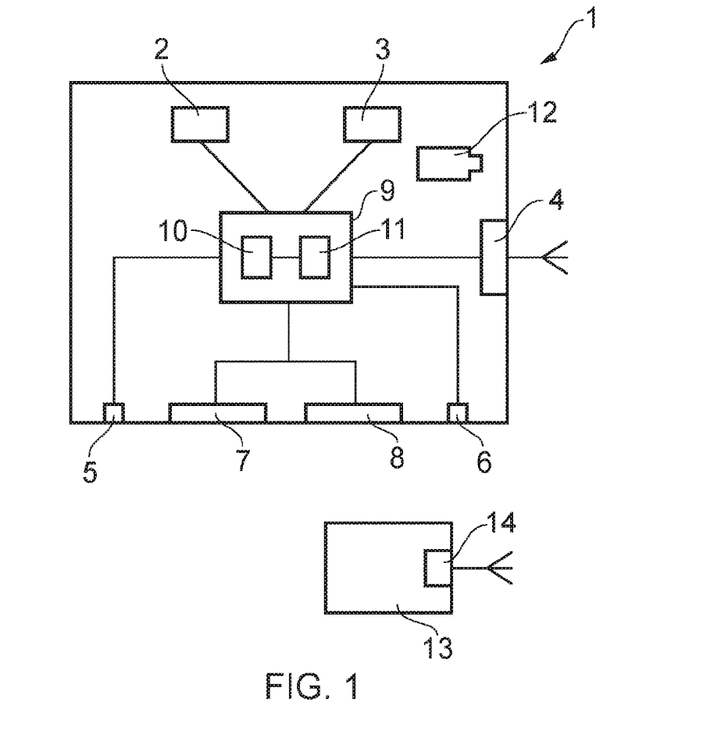
FIG. 1 shows a schematic diagram of a passenger seat monitor device.

FIG. 1 shows a device 1. The device 1 may be a discrete device that is packaged as a separate entity which can be attached to a vehicle. The device 1 may alternatively be formed as part of the vehicle and thus the device's outer shell may be defined by parts of the vehicle. The device 1 is configured to monitor one or more passenger seats of a vehicle.

The device 1 may be configured to be attached to the vehicle above the one or more seats the device monitors. The device 1 may be capable of being positioned proximal to the seats that they are monitoring. The device 1 may be positioned so that it is capable of being viewed by a passenger standing next to the seats that are monitored and displayed by that particular device 1. The device 1 may be positioned closer to the seats that they are monitoring than other seats within the vehicle.

The device 1 comprises at least one sensor 2, 3. As shown in FIG. 1, the device 1 may comprise more than one sensor. The device 1 may comprise a first sensor 2 and a second sensor 3. The device 1 may comprise a sensor per seat that is being monitored by the device 1. The at least one sensor 2, 3 is configured to monitor an occupancy status for each of the one or more seats.

The occupancy status of a seat may be occupied or vacant. If there is a passenger who is sitting in the seat then the seat may be deemed to be occupied. If there is no passenger who is sitting in the seat then the seat may be deemed to be vacant or unoccupied. A seat may have an occupancy status of vacant even if that seat is being used by a passenger. For instance, if a passenger puts a bag on the seat the seat is being used by a passenger but is not being used by a passenger to sit on it and so may still have an occupancy status of vacant.

The device 1 may also comprise a communication interface 4 configured to receive reservation conditions for each of the monitored seats. The communication interface 4 may be a wired communication interface. For example, the communication interface may be configured to receive a network cable and be capable of communicating with other devices using a wired communication protocol. Alternatively, communication interface 4 may be a wireless communication interface. For example, the wireless communication interface may be coupled to an aerial which permits the transmission and reception of electromagnetic waves such as radio waves. The wireless communication interface may operate according to a wireless communication protocol. It will be appreciated that any number of wireless communication protocols could be used. It is advantageous for situations where the device is self-powering, if the wireless communication protocol is one that has been designed to operate using low amounts of power, i.e. low power wireless communication protocols. Examples of wireless communication protocols that the communication interface 4 may operate in accordance with are Bluetooth, Zigbee and/or a mesh network protocol.

The device 1 may be configured to display an occupancy condition for each monitored seat. As described herein, the occupancy condition for each passenger seat at a given time may be one of occupied or vacant. The device 1 may be configured to display a reservation condition for each monitored seat. The reservation condition for each passenger seat at a given time may be may be one of reserved or unreserved (i.e. free). The reservation condition for each passenger seat may change along a vehicle journey. For instance, where there is a vehicle journey associated with the vehicle, the reservation conditions may comprise periods of the vehicle journey where a seat is reserved and period of the vehicle journey where the seat is unreserved. The device 1 may comprise a plurality of indicators which are configured to display the occupancy conditions and/or reservation conditions.

As shown in FIG. 1, the device 1 may comprise a seat occupancy indicator 5, 6 for each of the one or more seats that are being monitored by the device 1. The device 1 may comprise one seat occupancy indicator 5, 6 for each of the seats that are being monitored by the device 1. The occupancy indicators 5, 6 may be each be capable of displaying different colours and may display the seat occupancy condition by showing a particular colour. For instance, the occupancy indicators 5, 6 may be configured to display the colour red when the seat is occupied and display the colour green when the seat is unoccupied (i.e. vacant). Other colours could be used as appropriate. The occupancy indicators 5, 6 may be individual light sources, such as light bulbs or LED light sources. The occupancy indicators 5, 6 may be constituted as one body but being capable of displaying multiple different occupancy conditions at the same time. For instance, the occupancy indicators 5, 6 may be an LED array. The occupancy indicators 5, 6 may display the occupancy conditions by switching between displaying different symbols or words.

As shown in FIG. 1, the device 1 may comprise a reservation indicator 7, 8 for each of the one or more seats that are being monitored by the device 1. The device 1 may comprise one seat reservation indicator 7, 8 for each of the seats that are being monitored by the device 1. The reservation indicators 7, 8 may be may be each be capable of displaying different colours and may display the seat occupancy condition by showing a particular colour. For instance, the reservation indicators 7, 8 may be configured to display the colour yellow when the seat is reserved and display the colour blue when the seat is unreserved (i.e. free for a passenger to occupy it). In this instance the reservation indicators 7, 8 may be configured as per the occupancy indicators herein. The reservation indicators 7, 8 may alternatively be configured to display the reservation conditions by displaying words or symbols. The reservation indicators 7, 8 each be a display that is configured to change the content of the display in response to the reservation condition for the particular seat changing. The reservation indicators 7, 8, and hence the display, may be capable of displaying text and switching between showing text that indicates the seat is reserved (for instance by showing "reserved") and test that indicates the seat is unreserved (for instance by showing "free"). The reservation indicators 7, 8, and hence the display, may also indicate which seat has the particular reservation condition. For instance, by describing where the seat is relative to the vehicle i.e. ("window seat", "middle seat" "aisle seat"). The reservation indicators 7, 8 may also indicate when each seat is reserved along a vehicle journey. For instance, a particular seat may be reserved between particular stations (or stops) and be free the rest of the time. Therefore, the reservation indicators 7, 8 may indicate that the seat is reserved between particular stops. The device 1, may comprise one display per seat being monitored; in other words, each reservation indicator 7, 8 may be a separate display. Alternatively, reservation indicators 7, 8 may be constituted by a single display capable of displaying multiple reservation conditions at the same time.

The operation of the device may be regulated by a processing section 9. The processing section 9 comprises a processor 10 and a non-volatile memory 11. The processing section 9 may comprise more than one processor 10 and more than one memory 11. The memory 11 stores a set of program instructions that are executable by the processor, and reference data such as look-up tables that can be referenced by the processor in response to those instructions. The processor 10 may be configured to operate in accordance with a computer program stored in non-transitory form on a machine readable storage medium. The computer program may store instructions for causing the processor to perform the operations of the device 1 in the manner described herein.

During a particular vehicle journey, passengers may choose a seat to sit in and occupy it. However, during the journey the individual passengers may get up and cause the seat to be vacant for a short period of time for any number of reasons. For instance, they may want to visit the toilet or get refreshments from a buffet carriage. In these instances, whilst the immediate occupancy status of the seat is vacant whilst the passenger leaves the seat empty for a brief period of time, the seat is still being occupied by the passenger for the purposes of that vehicle journey. Therefore, the seat may have both an occupancy status (i.e. the instant occupancy state of the seat) and an occupancy condition (i.e. the occupancy state of the seat over at least a portion of the vehicle journey) associated with it. It is advantageous therefore if the device 1 is configured to calculate the occupancy condition of each monitored seat based on the occupancy status of the seat. This means that when passengers are searching for seats they are not guided to a seat that, whilst empty at that particular moment in time, is actually being used by a passenger already.

The device 1 may determine the occupancy condition for each of the one or more seats that it is monitoring based on the occupancy status for each of the one or more seats over a predefined time period. In this instance, the device 1 may decide that the occupancy status of a particular seat is occupied if a passenger sits in that seat for at least a threshold period of the predefined time period. The threshold period should be long enough that it accounts for a passenger taking a seat and then deciding that they would like to sit somewhere else. The threshold period may be 30 seconds, 1 minute, 2 minutes, 5 minutes. Therefore, the device 1 may be configured to determine that the seat is occupied if the occupancy status for the respective seat is occupied during the predefined time period.

The device 1 may be configured to determine the occupancy condition without reference to a threshold period, for instance the device 1 may be configured to determine that the occupancy condition for a seat is occupied if the occupancy status for the respective seat is occupied during the predefined time period. The device 1 may be configured to determine that the occupancy condition for a seat is occupied if the occupancy status for the respective seat is occupied for the predefined time period. The predefined time period may be related to the vehicle journey. There may be a predefined time period associated with each time that the vehicle stops at a vehicle stop (or station) to pick-up and drop-off passengers. The predefined time period may start when the vehicle stops at the vehicle stop. The predefined time period may start when the vehicle leaves the vehicle stop. This is because passengers usually choose their seat during the period a vehicle is at a vehicle stop or soon after that time. The predefined time period may be 30 seconds, 1 minute, 2 minutes, 5 minutes, 10 minutes.

As discussed herein, passengers are most likely to choose their seats during the initial period after a vehicle stop. Therefore, the period when it is most useful to display information regarding the occupancy conditions and reservation conditions of a seat is during that initial period. The device 1 may comprise a power source 12. The power source 12 may comprise a battery. This is particular advantageous in situations where the device 1 is to be retrofitted to a vehicle because it is usually expensive and time consuming to rewire a vehicle in such a way that additional components can be connected to the vehicle. In the case of a train, for instance, the wiring on the train can provide safety critical functionality to the train and so it can be difficult to get approval to connect new devices to the wiring of the train. Therefore, it is easier if devices can be supplied with their own source of power so that they only need to be affixed to the vehicle. The device 1 may be configured to display the occupancy conditions and/or reservation conditions for each of the one or more seats during defined display periods. These display periods mean that the device 1 can assist passengers to find a seat but then permit the device 1 to enter a low power mode during periods when the device's indications are less useful. This is particularly advantageous when the power source stores power locally to the device, i.e. by using a battery. The device 1 may therefore be configured with a power source life that is expected at least as long as the service life of the device 1. The device 1 may therefore be configured to display the occupancy condition for each of the one or more seats and/or the reservation condition for each of the one or more seats during display periods starting from a display stating time associated with when the vehicle enters a vehicle stop (i.e passenger pick-up location) and until a display duration has elapsed. The display starting time may be defined with reference to the time at which the vehicle comes to rest in the vehicle stop, and/or with reference to the time at which the vehicle opens its doors to permit passenger embarkation and disembarkation. The display stating time may be when the vehicle comes to rest and/or may be when the vehicle opens its doors. It will be appreciated that there will be multiple periods during which the device displays the occupancy conditions and/or reservation conditions.

The device 1 may be capable of energy harvesting. In this case, the power source 12 may comprise at least one energy harvesting unit. The energy harvesting unit may comprise photovoltaic cells to convert light into electrical energy, electromagnetic coils to convert electromagnetic waves, such as radio waves, into electrical energy, and/or motion devices that can convert vibrations into electrical energy. The energy harvesting unit(s) may power the device 1 directly and/or provide power to a battery to charge the battery.

The device 1 may be coupled to a power source provided by the vehicle. This may occur when it is easy to couple the device 1 to the vehicle's wiring or in the case that device 1 is fitted to the vehicle during production.

As described herein, the device 1 comprises a communication interface configured to receive reservation conditions for each of the one or more seats. The device 1 may be configured to communicate with at least one controller device 13. The device 1 may receive the reservation conditions from the controller device 13. The controller device 13 may comprise at least one communication interface 14. The controller device 13 may use communication interface 14 to communicate with a plurality of passenger seat monitoring devices 1. The communication between the device 1 and the controller device 13 may be via one or more relay devices in the case that device 1 and controller device 13 are not in direct communication contact. The device 1 may be configured to transmit the occupancy conditions to the controller device 13. The device 1 may be configured to transmit the occupancy statuses to the controller 13. The device 1 may be configured to transmit the occupancy condition and/or occupancy status when one or both change state. I.e. change from one of occupied and vacant to the other of occupied and vacant.

The device 1 may monitor two passenger seats. In this case, the sensor may be configured to monitor the occupancy status for each of the two seats. The sensor may monitor only the occupancy status of the two monitored seats. The device 1 may be configured to display the occupancy condition for each of the two monitored seats.

The device 1 may also be configured to display the reservation condition for each of the two seats. The device 1 may monitor three passenger seats. In this case, the sensor may be configured to monitor the occupancy status for each of the three seats. The sensor may monitor only the occupancy status of the three monitored seats. The device 1 may be configured to display the occupancy condition for each of the three monitored seats. The device 1 may also be configured to display the reservation condition for each of the three seats. The device 1 may monitor four passenger seats. In this case, the sensor may be configured to monitor the occupancy status for each of the four seats. The sensor may monitor only the occupancy status of the four monitored seats. The device 1 may be configured to display the occupancy condition for each of the four monitored seats. The device 1 may also be configured to display the reservation condition for each of the four seats.

The device 1 may comprise one sensor 2, 3 which monitors all of the seats or may comprise more than one sensor for monitoring the seats. The sensor(s) 2, 3 may comprise infra-red sensor(s). The sensor(s) 2, 3 may comprise ultra-sound sensor(s). The at least one sensor 2, 3 may comprise a transmitter and a receiver. The transmitter may be configured to transmit at least one beam and the receiver may be configured to receive back-scatters of the beam(s). The sensor 2, 3 may determine whether a seat is occupied based on the characteristics of the back-scatter. The sensor 2, 3 may compare the received signal of the back-scatter to pre-stored signals to determine whether the seat is occupied or not.

Figure 2:
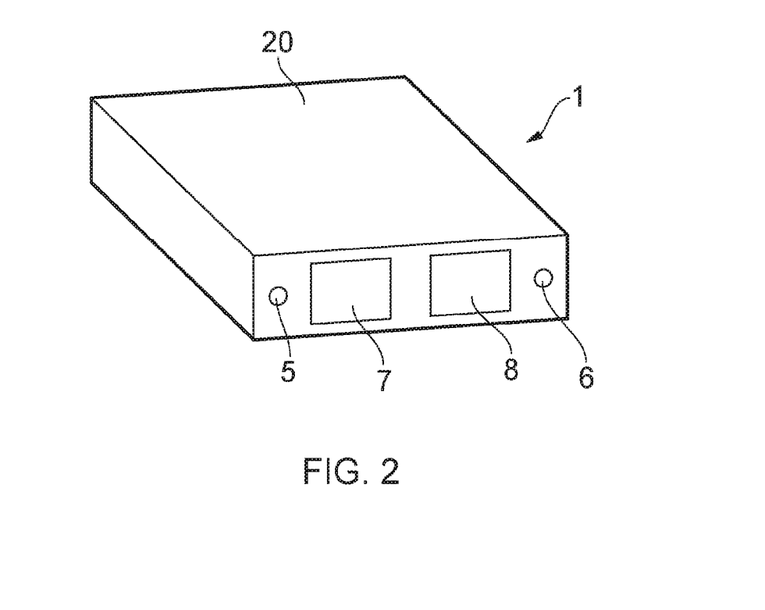
FIG. 2 shows a schematic illustration of a passenger seat monitor device.

FIG. 2 shows a schematic drawing of a configuration of device 1. The device 1 comprises a housing 20. The housing 20 contains the parts of the device 1. The housing 20 comprises openings through which the device 1 is configured to display the occupancy conditions and/or the reservation conditions. This is shown in FIG. 2 by reservation condition indicators 7, 8 and occupancy condition indicators 5, 6. The reservation condition indicator(s) and occupancy condition indicator(s) present information to the exterior of the device. As the device 1 is a discrete device contained within the housing 20, the device 1 displays its information in the direct vicinity of the seats being monitored. This is advantageous because it provides the information to passengers where they need it. I.e. close to the seat that they need to decide whether it is free or not. The device 1 may be configured to display the reservation conditions and occupancy conditions on one surface of the housing 20. In this case, the reservation condition indicator(s) and occupancy condition indicator(s) may be located on one surface of the housing 20. Thus, the information displayed by the device is presented in one direction on the device 1.

Figure 3:
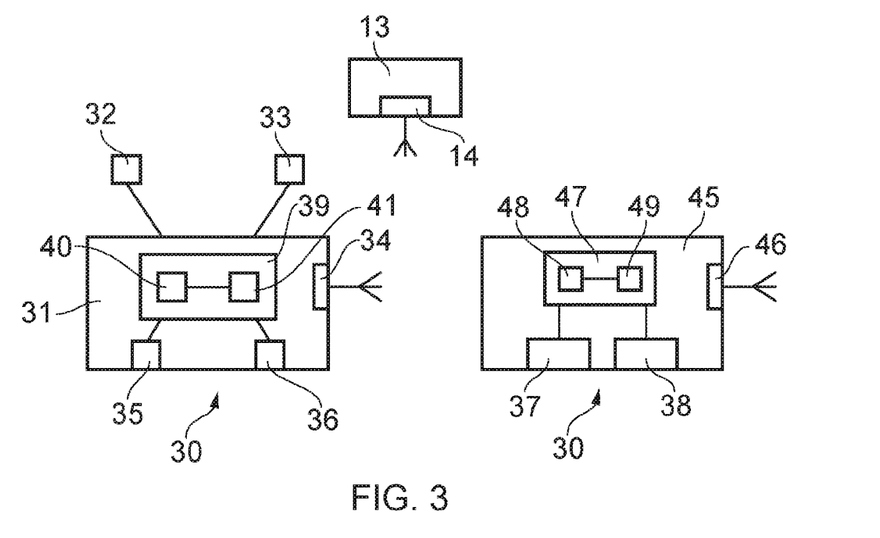
FIG. 3 shows a schematic diagram of a passenger seat monitor system.

FIG. 3 shows a passenger seat monitoring system 30 which operates according to the principles described herein. The system 30 may be integrated into the vehicle that is having its seats monitored by the system 30. The system comprises a first display unit 31. The system comprises at least one sensor 32, 33. As shown in FIG. 3, the system 30 may comprise a first sensor 32 and a second sensor 33. The system 30 may comprise a sensor per seat that is being monitored by system 30. The at least one sensor 32, 33 is configured to monitor an occupancy status of each of the one or more seats as described in relation to at least FIG. 1 herein. The at least one sensor 32, 33 is communicatively coupled to the first display unit 31.

The first display unit 31 may comprise a communication interface 34. The first display unit 31 may use the communication interface 34 to transmit occupancy status and/or occupancy condition information to at least one controller device 13 as described herein with reference at least to FIG. 1.

The first display unit 31 may be configured to display an occupancy condition for each monitored seat associated with the sensors communicatively coupled to first display unit 31. The first display unit 1 may be configured to determine the occupancy condition based on the occupancy status(es) received from the sensor(s) 32, 33. The ways in which first display unit 1 may display the occupancy conditions and determine the occupancy condition are as described herein with reference at least to FIG. 1. As shown in FIG. 3, the first display unit 31 may comprise a seat occupancy indicator 35, 36 for each of the one or more seats that are being monitored by the first display unit 31. The seat occupancy indicator(s) 35, 36 may take any of the forms as described herein with reference to at least FIG. 1.

The operation of the first display unit may be regulated by a processing section 39. The processing section 39 comprises a processor 40 and a non-volatile memory 41. The processing section 39 may comprise more than one processor 40 and more than one memory 41. The memory 41 stores a set of program instructions that are executable by the processor, and reference data such as look-up tables that can be referenced by the processor in response to those instructions. The processor 40 may be configured to operate in accordance with a computer program stored in non-transitory form on a machine readable storage medium. The computer program may store instructions for causing the processor to perform the operations of the first display unit 31 in the manner described herein. The processing section 39 may be part of first display unit 31. Alternatively, processing section 39 may be remote from first display unit 31 and send commands to the first display unit 31 to display the required information.

The system 30 may comprise a second display unit 45. The second display unit 45 may comprise a communication interface 46 configured to receive reservation conditions for each of the monitored seats. The operation of the communication interface 46 may be as described herein with reference to at least FIG. 1. The second display unit 45 may be configured to display a reservation condition for each monitored seat. The ways in which the second display unit 45 may display the reservation condition(s) are as described herein with reference to at least FIG. 1. The second display unit 45 may comprise a reservation indicator 37, 38 for each of the seats that are being monitored by the sensors 32, 33 associated with the first display unit 31. The ways in which the reservation indicator(s) may function are as described herein with reference to at least FIG. 1.

The operation of the second display unit may be regulated by a processing section 47. The processing section 47 comprises a processor 48 and a non-volatile memory 49. The processing section 47 may comprise more than one processor 40 and more than one memory 49. The memory 49 stores a set of program instructions that are executable by the processor, and reference data such as look-up tables that can be referenced by the processor in response to those instructions. The processor 48 may be configured to operate in accordance with a computer program stored in non-transitory form on a machine readable storage medium. The computer program may store instructions for causing the processor to perform the operations of the second display unit 45 in the manner described herein. The processing section 47 may be part of second display unit 45. Alternatively, processing section 47 may be remote from second display unit 45 and send commands to the second display unit 45 to display the required information. The processing section 39 associated with first display unit 31 may be shared between the first display unit 31 and the second display unit 45. I.e. they may be the same processing section and may be located remote from both the first display unit 31 and the second display unit 45.

One or both of the first and second display units 31, 45 may be coupled to a power source provided by the vehicle. This may occur when it is easy to couple the device 1 to the vehicle's wiring or in the case that device 1 is fitted to the vehicle during production. Alternatively, one or both of the first and second display units 31, 45 may comprise a power source as described herein with reference to at least the device 1 and FIG. 1.

Figure 4:
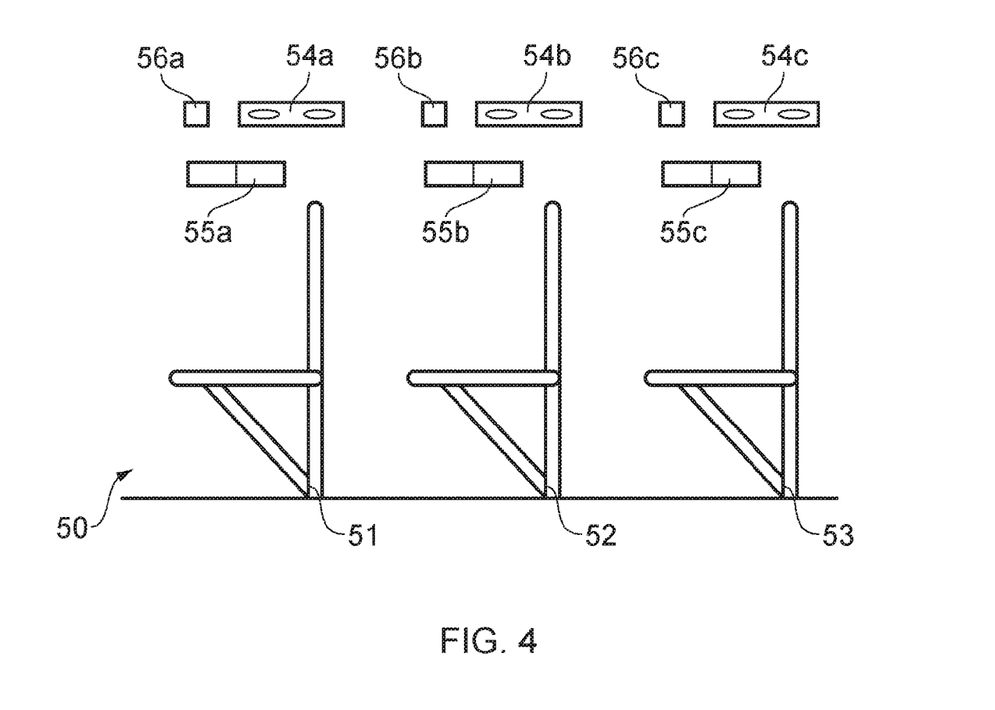
FIG. 4 shows a schematic illustration of an interior of a vehicle comprising a passenger seat monitor system.

FIG. 4 shows a schematic drawing of a configuration of the first and second display units. The drawing shows the interior 50 of a vehicle comprising a plurality of seats 51, 52, 53. As the drawing is in side view, it will be appreciated that more than one seat could be present in each row of seats indicated respectively by 51, 52 and 53. Thus, each first and second display units could display information regarding more than one seat. FIG. 4 shows three sets of first 54a-c and second 55a-c display units and three sets of sensors 56a-c. Each of the first and second display units are positioned proximal to the seats that they are monitoring. The first and second display units may be positioned so that they are capable of being viewed by a passenger standing next to the seats that are monitored and displayed by that particular first and second display units. Each of the first and second display units may be positioned closer to the seats that they are monitoring than other seats within the vehicle. Each sensor or sensors that are monitoring a set of seats are positioned so that signals can be sent to and received from the area in the vicinity to the seat. In FIG. 4, the sensors are placed above the seats being monitored. The sensor or sensors may be positioned closer to the seats that they are monitoring than other seats within the vehicle. The first and second display units may be formed in part of the interior of the vehicle body.

FIG. 4 can also be used to describe the positioning of the device 1 described with reference to FIGS. 1 and 2. In the case of device 1, device 1 may be positioned in the position shown by first display units 54a-c. In that case, as device 1 comprises the sensors and reservation indicators separate sensors 56a-c and second display unit 55a-c would not be present.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device for monitoring one or more passenger seats of a vehicle, the device comprising:
at least one sensor configured to monitor an occupancy status for each of the one or more seats; and
a communication interface configured to receive reservation conditions for each of the one or more seats;
wherein the device is configured to:
display an occupancy condition for each of the one or more seats and a reservation condition for each of the one or more seats; and
determine the occupancy condition for each of the one or more seats based on the occupancy status for each of the one or more seats over a predefined time period.

2. The device according claim 1, wherein the occupancy status comprises occupied and vacant.

3. The device according to claim 1, wherein the occupancy condition comprises occupied and vacant.

4. The device according to claim 1, wherein the reservation condition comprises reserved and unreserved.

5. The device according to claim 4, wherein a vehicle journey is associated with the vehicle, and the reservation condition comprises periods of the vehicle journey where a seat is reserved and periods of the vehicle journey where the seat is unreserved.

6. The device according to claim 1, wherein the device is configured to determine that the occupancy condition for a seat is occupied if the occupancy status for the respective seat is occupied during the predefined time period and/or for a threshold period of the predefined time period.

7. The device according to claim 1, wherein the device is configured to determine that the occupancy condition for a seat is vacant if the occupancy status for the respective seat is vacant during the predefined time period and/or for a threshold period of the predefined time period.

8. The device according to claim 1, wherein the device is configured to display the occupancy condition for each of the one or more seats and the reservation condition for each of the one or more seats only during display periods when passengers of the vehicle are boarding the vehicle and initially locating a seat.

9. The device according to claim 1, wherein the device is configured to display the occupancy condition for each of the one or more seats and the reservation condition for each of the one or more seats during display periods starting from a display starting time associated with when the vehicle enters a passenger pick-up location and until a display duration has elapsed.

10. The device according to claim 1, wherein the device monitors two or three passenger seats, the sensor is configured to monitor the occupancy status for each of the two or three seats, and the device is configured to display the occupancy condition for each of the two or three seats and the reservation condition for each of the two or three seats.

11. The device according to claim 1, wherein the device comprises a seat occupancy indicator for each of the one or more seats and the seat occupancy indicators each display the occupancy condition for a respective one of the one or more seats.

12. The device according to claim 1, wherein the device comprises a reservation indicator for each of the one or more seats and the reservation indicators each display the reservation condition for a respective one of the one or more seats.

13. The device according to claim 1, wherein the device is configured to transmit the occupancy conditions to a controller device.

14. The device according to claim 1, wherein the device is configured to transmit the occupancy conditions to a controller device when the individual occupancy conditions change.

15. The device according to claim 1, wherein the device comprises one sensor per seat of the one or more seats and each sensor is configured to monitor the occupancy status for a respective one of the one or more seats.

16. The device according to claim 1, wherein the sensor(s) comprise infra-red sensors and/or ultra-sound sensors.

17. The device according to claim 1, wherein the device comprises a power source.

18. The device according to claim 1, wherein the device is formed as part of the vehicle.

19. The device according to claim 1, wherein the device is a discrete device and is configured to be attached to the vehicle.

20. The device according to claim 1, wherein the device is configured to be attached to the vehicle above the one or more seats the device monitors.

21. A system for monitoring one or more passenger seats of a vehicle, the system comprising:
- at least one sensor configured to monitor an occupancy status for each of the one or more seats;
- a first display unit configured to: display an occupancy condition for each of the one or more seats, and determine the occupancy condition for each of the one or more seats based on the occupancy status for each of the one or more seats over a predefined time period; and
- a second display unit configured to: receive reservation conditions for each of the one or more seats, and display a reservation condition for each of the one or more seats;
- wherein the first and second display units are positioned proximal to the one or more seats.

22. The system according to claim 21, wherein the first and second display units are positioned so that the occupancy conditions and reservation conditions are visible to a passenger located beside the one or more seats.

23. The system according to claim 21, the second display unit comprises a communication interface configured to receive the reservation conditions for each of the one or more seats.

* * * * *